INVENTOR.
ALVIN NASHLEY

Dec. 4, 1951     A. NASHLEY     2,577,476
LAMINATED MATERIAL AND METHOD FOR MAKING THE SAME
Filed Jan. 28, 1948     4 Sheets-Sheet 2

INVENTOR.
ALVIN NASHLEY
BY Mock & Blum
ATTORNEYS

Dec. 4, 1951 A. NASHLEY 2,577,476
LAMINATED MATERIAL AND METHOD FOR MAKING THE SAME
Filed Jan. 28, 1948 4 Sheets-Sheet 3

*INVENTOR.*
ALVIN NASHLEY
BY
ATTORNEYS

Dec. 4, 1951            A. NASHLEY            2,577,476

LAMINATED MATERIAL AND METHOD FOR MAKING THE SAME

Filed Jan. 28, 1948            4 Sheets-Sheet 4

INVENTOR.
ALVIN NASHLEY
BY
ATTORNEYS

Patented Dec. 4, 1951

2,577,476

UNITED STATES PATENT OFFICE 2,577,476

LAMINATED MATERIAL AND METHOD FOR MAKING THE SAME

Alvin Nashley, New York, N. Y.

Application January 28, 1948, Serial No. 4,891

16 Claims. (Cl. 154—124)

My invention relates to a new and improved flexible and elastic laminated or composite material, and a new and improved method and machine for making flexible and elastic composite material. As one example, my invention relates to a laminated fabric.

In one embodiment, the improved laminated or composite material comprises two outer stretchable layers which are connected at their inner faces to an intermediate elastic layer.

These outer layers may be elastic, in addition to being stretchable. If these outer layers are elastic, they ordinarily have less recovery than natural rubber, upon unloading. These outer layers may be fabric layers, as illustrated by weft-knitted fabrics, warp-knitted fabrics, woven fabrics, netted fabrics, etc. Each outer layer is preferably a fabric layer or layer of other material of the type which can be stretched in a selected direction, and which contracts laterally to said selected direction, when stretched in said selected direction. Such fabrics may be made of any fiber, natural or synthetic or semi-synthetic.

A weft-knitted fabric, of the stockinet type which is used for making hosiery, underwear, etc., is an example of such material. Jersey or tricot material is another example.

Such weft-knitted fabric is easily stretchable in the direction of its loops, and its width is diminished by such stretching.

Instead of using outer fabric layers, I can use stretchable or elastic films or sheets or layers of various resins or plastics. Many such non-fabric materials which I can use as outer layers are disclosed in "Handbook of Plastics" by Simonds & Ellis, published in 1943 by D. Van Nostrand Company, Inc., and in "The New Fibers" by Sherman, published in 1946 by D. Van Nostrand Company, Inc., and in "Synthetic Resins and Plastics" by Powers, published in 1943 by John Wiley & Sons Inc.

These text-books also disclose many fibers which may be used in making the outer layers if said outer layers are knitted, woven, netted, etc.

The elastic intermediate film or sheet or layer may be natural rubber or a substitute for natural rubber, such as various synthetic resins, various plastics, and synthetic rubbers, many of which are disclosed in said text-books.

It is well-known to connect two fabric layers to an intermediate elastic layer, while such intermediate layer is stretched. For example, prior methods and laminated composite materials are disclosed in the following United States Patents: 16,601, Millerd, February 10, 1857; 2,004,110, Head, June 11, 1935; 2,235,682, Hawley, March 18, 1941; 2,235,690, Teague, March 18, 1941; Re. 22,290, Teague, March 16, 1943; and 2,397,838, Chavannes, April 2, 1946.

According to my improved method, I stretch the intermediate elastic layer in a selected direction. This step is old. For convenience, this selected direction is designated as the longitudinal direction.

I thus reduce the width or lateral dimension of the intermediate elastic layer. As one example, the normal width of the unstretched intermediate elastic layer is 36 inches. The longitudinal stretching reduces said normal width to 28 inches. While maintaining said intermediate elastic layer under said longitudinal tension, I stretch said layer laterally, so as to restore its diminished width of 28 inches to its normal width of 36 inches. This an important novel feature of my invention.

In this example, I refer to a weft-knitted stockinet fabric, whose fiber is cotton, silk, wool, rayon, nylon, etc.

Each said layer of stockinet fabric has a normal width of 48 inches when it is not stretched, in this example. Such fabric has some elasticity, even though its yarn has little or no elasticity. Such fabric can be easily stretched in the direction of its loops, so as to reduce its normal width of 48 inches, to a reduced width of 36 inches, namely, to the normal width of the intermediate elastic sheet or layer.

The direction of the loops of such stockinet fabric is designated as its longitudinal direction.

I join the two outer layers of such fabric to the intermediate elastic layer of rubber or rubber substitute, while said fabric layers are maintained under longitudinal tension with a reduced width of 36 inches, and while the intermediate elastic layer is maintained under both longitudinal and lateral tension, so that the width of said intermediate elastic layer is also 36 inches, due to the applied lateral tension. At the time of joining, the length of the intermediate layer exceeds its normal length, and its width equals its normal width, and the length of each fabric layer exceeds its normal length and its width is less than its normal width and such reduced width of each outer layer is equal to the normal width of the intermediate elastic layer, due to the lateral tension of such intermediate layer.

When I release the three joined or connected layers from tension, the normal width of the resultant composite material when it is untensed, remains at 36 inches or substantially 36 inches. Since this is the normal width of the intermediate elastic layer, the improved laminated material is elastic in the direction of such width, in addition to being longitudinally and diagonally stretchable, so that it has four-way stretch.

The normal length of the laminated or composite material when it is untensed, is less than the normal length of the fabric layers, and equal to the normal length of the intermediate elastic layer. Thus, if I use such weft-knitted stockinet fabric, I can use two identical pieces of such stockinet fabric, each having a normal unstretched length of 133 yards and a normal width of 48 inches. The normal length of the composite material is 100 yards, for example, when said composite material has its said normal width of 36 inches.

Such composite fabric is very stretchable and elastic in the longitudinal direction of its loops, also laterally to said loops, and also in each diagonal direction.

The outer faces of such composite fabric are preferably free from wrinkles or pleats. If there are surface wrinkles or pleats, they are substantially invisible. Said outer faces have the normal feel and appearance of the outer layers.

As disclosed in said prior patents, it is old to apply a latex or rubber binder or other binder to the inner faces of said outer layers, in order to facilitate joining said outer layers to the intermediate elastic layer. Many substitutes for a latex or rubber binder are disclosed in said textbooks and are otherwise well-known. I prefer to use a dry latex binder, and an intermediate elastic layer of natural rubber. I preferably apply said binder as an aqueous dispersion to one face of each of the outer layers or sheets or films, while said outer layers or sheets or films are unstretched or substantially unstretched. The particles of rubber in the aqueous latex dispersion may be wholly cured or vulcanized or said particles of rubber may be uncured or partially cured or vulcanized. I preferably dry said aqueous dispersion, before joining the outer layers to the intermediate elastic rubber layer, so that said dry binder layers are tacky and adhere well to the intermediate elastic rubber layer. During the drying operation, the layers of fabric or the like are preferably wholly or substantially unstretched.

If the particles of rubber in said aqueous dispersion are not pre-cured or pre-vulcanized, I compound such dispersion with sufficient accelerator and curing agent or agents, so that said particles are easily wholly or partially cured at moderate drying temperature, whose maximum is preferably 100° C. These directions apply generally when I use a binder other than natural rubber.

The outer layers are preferably identical, although the invention is not limited to this feature.

If I use woven outer layers, such layers are preferably of a loose or open weave, such as cotton sheeting or marquisette, in order to prevent or minimize visible surface wrinkles or pleats when such outer layers are longitudinally contracted in the direction of their warp threads or yarns in the finished composite material. Said warp threads or yarns may be of the familiar type which have some longitudinal stretch or elasticity, even though such threads or yarns are made of textile fibers, such as silk, cotton, rayon, wool, etc., which have limited elasticity.

Instead of stretching the outer woven fabric layers in the direction of their warp threads, I can use bias-cut woven fabrics as the outer layers, so that the longitudinal direction of stretch is inclined to the warp threads. Such bias-cut woven fabrics contract laterally when thus stretched, and the finished laminated material has two-way and even four-way stretch.

The longitudinal stretch of each outer layer of fabric or the like, may be uniform or non-uniform along the width of said outer layer. I prefer to apply a uniform longitudinal stretch to each outer layer, along its entire width.

I can stretch each outer layer to its limit of elongation or to less than said limit.

If I use textile fabrics as the outer layers, said outer layers are preferably more stretchable in the longitudinal direction of stretch which is applied in my method, than laterally to such longitudinal direction. This applies if the outer layers are stretchable sheets or films, such as films made of plastics or resins.

I can perforate the intermediate elastic layer with fine holes to permit the passage of air. If I use outer layers which are sheets or films, I can also perforate them for this purpose. Such perforations may be of sufficiently small diameter to prevent the passage of water.

When I join the outer layers to the intermediate elastic layers, such outer layers are preferably dry, but they may be wetted with water or other wetting agent while they are thus joined to the intermediate elastic layer.

When using soft knitted or woven fabric material in the outer layers, I can size such soft fabric materials, in order to prevent or minimize the formation of wrinkles or pleats in the finished material.

After producing a composite material with dry outer fabric layers, I can saturate such outer fabric layers with water at 20° C.–25° C., and then dry such fabric layers under any desired tension, at a temperature whose maximum is 100° C. During such drying, I can subject said outer fabric layers to a rubbing action, as by leading them under tension over hot rods or rolls, thus producing an improved surface gloss.

I prefer to join the layers of latex binder to the intermediate sheet of natural rubber, while said layers are only partially cured or vulcanized. The intermediate sheet of natural rubber may be also only partially cured or vulcanized at this stage. I then wind the composite fabric under any desired tension, which is preferably slight, spirally on a take-up roll. While maintaining such composite material preferably at its final finished width, I keep the spirally wound roll under such tension for a suitable period, as one to two weeks, at 20° C.–25° C., in order to complete the curing. An elevated temperature will reduce this storage period. During this storage period, I prefer to complete the curing or vulcanization of the binder layers and the intermediate layer.

At the end of this storage period, the finished composite material preferably has the normal width of the intermediate elastic sheet, such as 36 inches.

By regulating the longitudinal stretch of the outer layers at the zone where they are combined with the intermediate layer, I can produce finished composite materials or fabrics of different degrees of stretch.

By using a woven fabric of limited longitudinal extensibility in the direction of its warp-threads, I can produce a one-way stretch finished composite fabric, which is stretchable and elastic, only in the direction of the filler threads.

While I prefer to laterally stretch the longitudinally stretched elastic layer so as to restore its full original normal width in the combining zone, I may laterally stretch said elastic layer to less than its full original normal width or even to more than said normal width, in said combining zone.

Numerous additional objects and advantages and features of my invention are disclosed in the annexed description and drawings, which illustrate a preferred embodiment of my improved method and mechanism for practicing such method, and which also illustrate certain auxiliary apparatus.

Figures 2, 7:
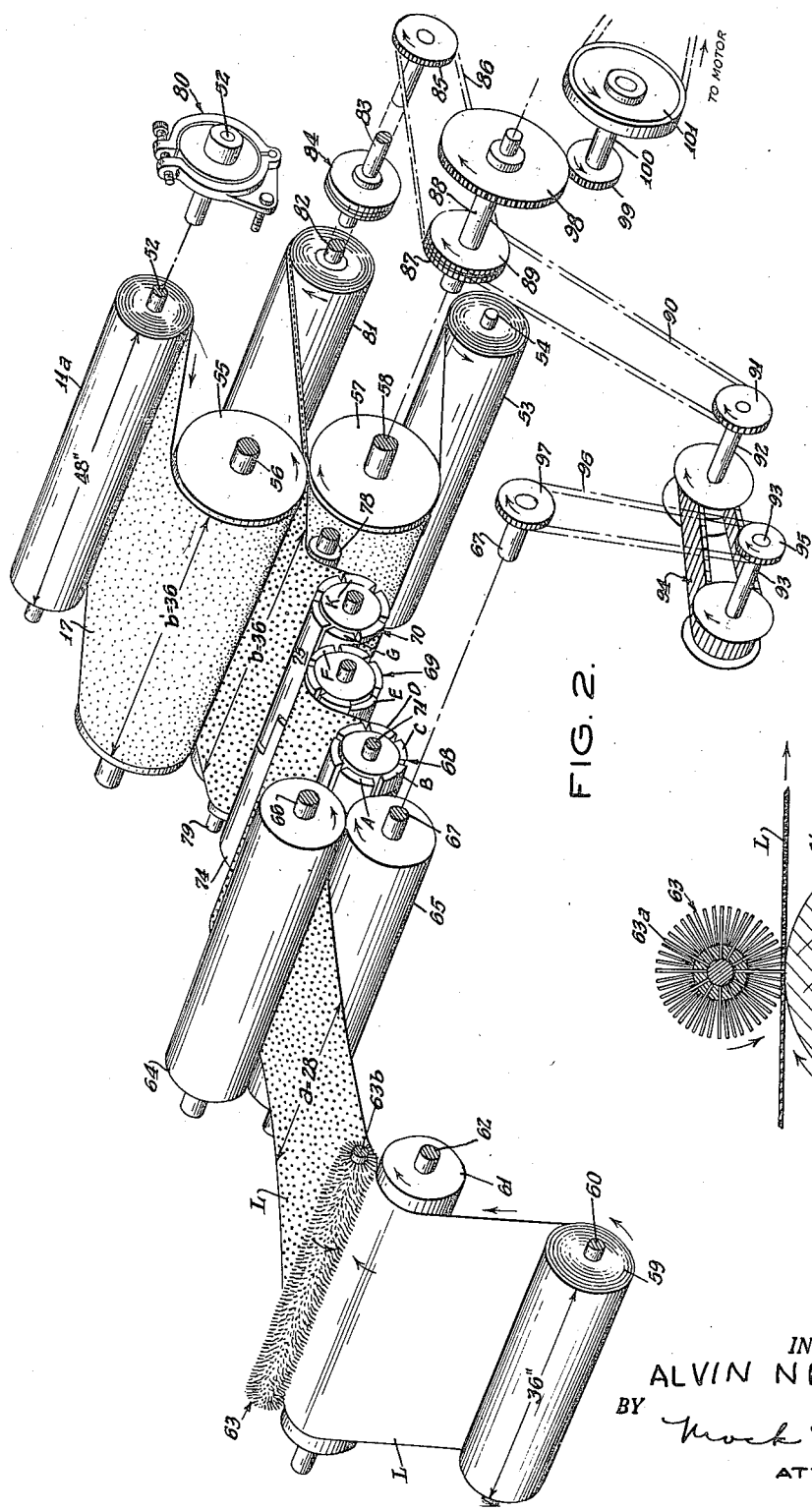
Fig. 2 is a diagrammatic perspective view which illustrates the operation of the doubling machine of Fig. 1.
Figure 4:
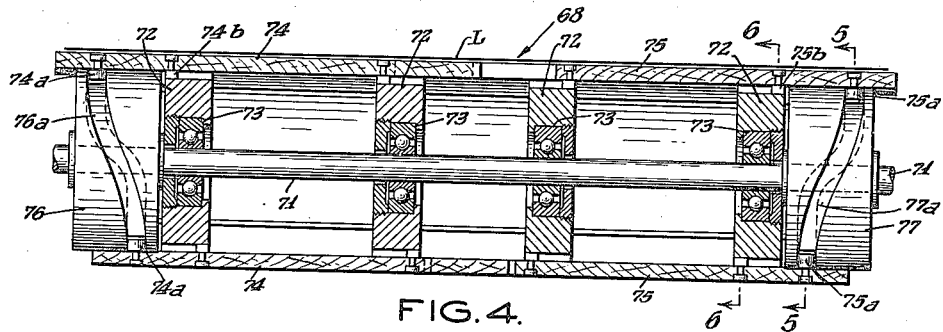
Fig. 4 is a section on the line 4—4 of Fig. 3.
Figures 5, 6:
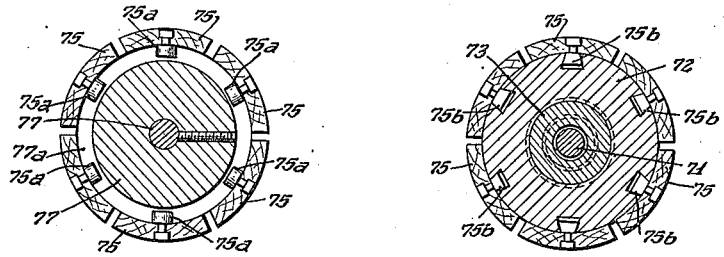
Figure 3:
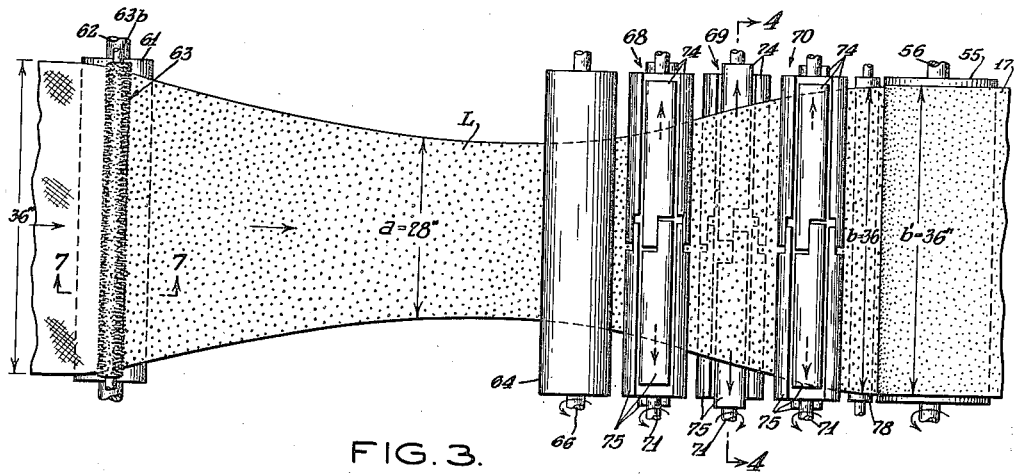
Fig. 3 is a partial top plan view, which illustrates the longitudinal feed of the rubber sheet, and the change in shape of the rubber sheet.
Figure 8:
Figure 9:
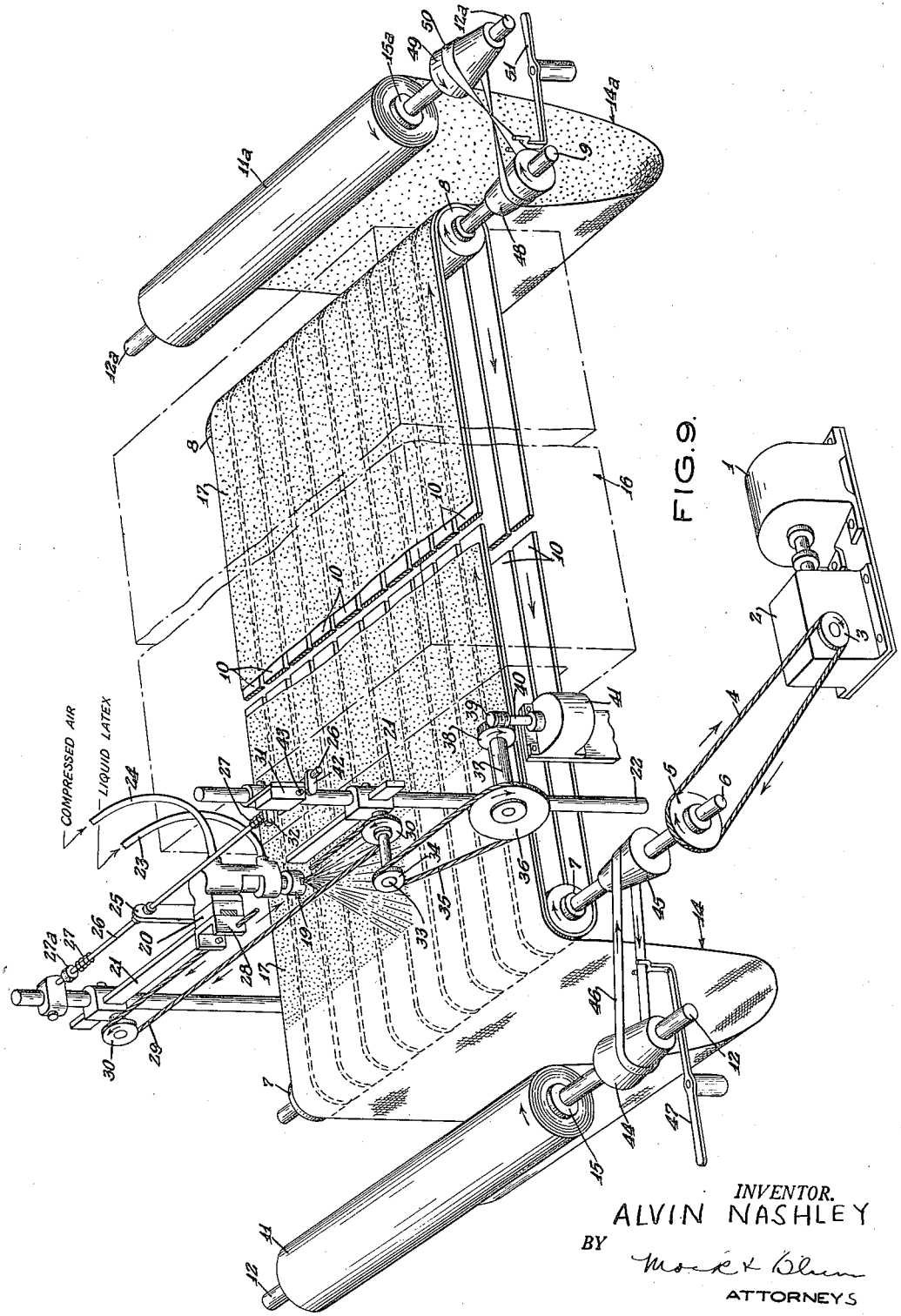

Figs. 5 and 6 are respectively sections on the lines 5—5 and 6—6 of Fig. 4;

Fig. 7 is a section on the line 7—7 of Fig. 3;

Fig. 8 is an enlarged cross-section of the combined composite fabric or material; and Fig. 9 is a diagrammatic view which illustrates an optional preliminary stage in the treatment of each of the layers of fabric before it is combined with the intermediate layer. Fig. 9 shows in diagrammatic perspective view, how one of the layers of fabric which is used for making the composite fabric, is optionally coated at one face, with latex adhesive or other binder or adhesive.

Fig. 9 shows a motor 1, whose shaft operates reduction gearing in a gear box 2. This reduction gearing operates a pulley 3. Pulley 3 is connected by a belt 4 to a pulley 5 which is fixed to a shaft 6.

Several pulleys 7 are fixed to the shaft 6. Each pulley 7 is associated with a companion and longitudinally alined pulley 8. Pulleys 8 are fixed to a shaft 9. A respective endless belt 10 is mounted on each pulley 7 and its companion pulley 8, so that a suitable number of such belts 10 is provided. The layer of fabric or other material which is to be coated, is taken off a spirally wound magazine roll 11 of such material or fabric. This roll 11 of fabric is mounted upon a mandrel 15 which is detachably fixed to a turnable shaft 12. Between the spirally wound roll 11 and the pulleys 7, the fabric forms a loop 14. The fabric or other material is thus supported along its entire width with little tension or zero tension upon the top runs of the respective endless belts 10, while the fabric or other material is fed below the spraying apparatus which sprays a latex binder or the like. The fabric or other material is also thus supported with little or no tension upon the top runs of the belts 10, while the coated fabric or other material is led through the electrically heated drying chamber 16, in which the latex coating is dried to tacky condition.

The binder preferably does not penetrate to the bottom face of the fabric or other material.

While I prefer to apply the latex coating material or adhesive and also to dry said coating material or adhesive in chamber 16, while the fabric or other material is under little or no tension, my invention is not limited to this feature, in the broader aspects of my invention.

The latex is optionally supplied by a spraying nozzle 19, which is fixed to a carriage 20. Said carriage 20 has a through-and-through slot of rectangular cross-section. A guide rod 21 fits substantially closely in said rectangular slot of the carriage 20, so that the carriage 20 can be slid laterally to-and-fro on guide rod 21. The guide rod 21 is detachably fixed to standards 22, which are part of the fixed frame of the coating machine. Flexible pipes 23 and 24 are connected to the spraying nozzle 19. The latex is supplied through the pipe 23, and compressed air or other compressed gas is supplied through the pipe 24 in order to spray the latex or other liquid binder in fine drops, in order to form a continuous coating 17. This binder material may wholly or partially penetrate the respective layer.

The carriage 20 has an extension arm 25. Said extension arm 25 has a cylindrical bore, through which a cylindrical rod 26 extends with a substantially close fit. The rod 26 is connected slidably to the standards 22, so that rod 26 has a limited movement relative to standards 22, in the direction of the axis of rod 26. A helical spring 27 is mounted upon the rod 26, at each end thereof. A forked bracket 28 is also fixed to the carriage 20. A belt 29 has separated ends, which are fixed respectively to the legs of the forked bracket 28. This belt 29 is mounted between its separated ends upon the pulleys 30, which are connected detachably to the standards 22. One of the standards 22 is provided with a switch box 31. This switch box 31 contains a conventional switch which is actuated automatically in order to reverse the direction of movement of the carriage 20. Since such reversing switch is well-known per se, it is not disclosed in detail. When the arm 25 of carriage 20 is moved towards the switch box 31, said arm 25 strikes the respective spring 27, which acts as a buffer. This respective spring 27 is compressed, so as to exert pressure upon a finger 32 which is fixed to the rod 26, thus sliding rod 26 relative to standards 22. When the finger 32 is thus moved in unison with rod 26 toward the switch box 31, said finger 32 operates the reversing switch in the switch box 31. One of the pulleys 30 is fixed to a shaft 33, which also has a pulley 34 which is connected by an endless belt 35 to a pulley 36, which is fixed to the shaft 37. A worm gear 38 is also fixed to shaft 37. Said worm gear 38 meshes with a worm 39 which is fixed to a shaft 40 of an electric motor 41. The reversing switch in the switch box 31 operates to reverse the direction of rotation of the motor 41 and of its shaft 40 in the conventional manner. The spray nozzle 19 is thus reciprocated laterally back and forth at a desired rate, so that the top face of the fabric is uniformly covered with a sprayed layer of latex 17. When the carriage 20 is moved in a direction away from the switch box 31, the arm 25 of carriage 20 strikes the respective spring 27, thus moving the rod 26 in its limited longitudinal stroke, so that the finger 42 of rod 26 operates the respective extension 43 of the reversing switch. Hence the direction of movement of the spray nozzle 19 will be reversed at the end of each stroke thereof.

The coated fabric which passes out of the drying chamber 16, with the dry layer of wholly or partially cured or wholly uncured coating of rubber thereon, forms another loop 14a, before being wound to form a spiral take-up roll 11a upon the mandrel 15a which is fixed detachably to the winding shaft 12a. A variable drive for shaft 12a is provided, in order to compensate for the increase in diameter of the take-up roll 11a, in order to maintain loop 14a. Conventional adjustable drive means for winding shaft 12a and for magazine shaft 12 are diagrammatically shown. The shaft 12 of the magazine roll 11 is provided with a frusto-conical pulley 44, which is associated with a companion frusto-conical pulley 45, which is fixed to the driven shaft 6. The tapers of these frusto-conical pulleys 44 and 45 are opposed. A conventional belt 46 connects said pulleys 44 and 45. The lateral position of the belt 46 can be regulated by an ordinary belt shifter 47, thus regulating the effective pulley ratio between the pulleys 44 and 45. The rate at which the uncoated material is unwound from roll 11 can thus be regulated, in order to maintain loop 14, so that the fabric is coated under zero tension or negligible tension. The endless belts 10 drive the shaft 9. This shaft 9 and the winding shaft 12a are provided with respective frusto-conical pulleys 48 and 49, which are connected by a crossed belt 50 whose position is regulated by a conventional belt shifter 51. The rate at which the material is wound upon the take-up roll 11a can also be thus regulated, thus maintaining the loop 14a and coating the fabric and winding the coated fabric, under zero or negligible tension. The fabric is thus coated and dried and wound up while its length and width are normal.

The coating of latex or the like may be slightly tacky in the take-up roll of material 11a, but said coating should be sufficiently set or dried or cured so as to prevent the connection of the layers of the take-up roll 11a to each other by said coating.

Fig. 2 shows the roll 11a of coated fabric, which has been transferred to a shaft 52 of the combining machine. The detachable mandrel on which the roll 11a is wound, is not shown in Fig. 2. Fig. 2 also shows a second roll 53 of fabric, which is mounted in the shaft 54. The fabric of roll 53 is also coated at one face thereof, identically with the fabric of the roll 11a. These rolls of fabric are preferably made of identical material, in order to provide equal stretch and other properties. The two coated sheets of fabric which are led off the rolls 11a and 53, are passed around and between respective pressure or combining rolls 55 and 57, which are mounted on respective shafts 56 and 58 of the combining machine, so that the coated faces of the two sheets of fabric face each other. These coated faces are connected to each other in the machine by a sheet of elastic of wholly or partially vulcanized rubber L. This sheet of rubber L can be made in any suitable manner. Said rubber sheet L is taken off a magazine roll 59, which is mounted upon a shaft 60 of the combining machine. The rubber sheet L is passed between a lower pressure roll 61 which is mounted upon a shaft 62, and an upper perforating roll 63 which is mounted upon a shaft 63b. The shafts 63b and 62 are rotated in unison. The upper roll 63 may be a cylindrical pressure roll, if it is not desired to perforate the elastic sheet L. The perforating roll 63 has a series of piercing members 63a, which are shown in Fig. 7, in order to form a series of fine perforations uniformly in the rubber sheet L. After being thus perforated, the rubber sheet L passes between pressure feed rolls 64 and 65, which are mounted upon respective shafts 66 and 67.

The bearings of the shaft 63b are subjected to suitable high downward pressure, as will be later more fully explained, so that the perforating or piercing members 63a may partially penetrate the roll 61, which is made of wood or other material for this purpose.

The elastic rubber sheet L is optionally longitudinally stretched anterior the pressure feed rolls 64 and 65, in order to reduce its width, as from a normal width of 36 inches to a reduced width of 28 inches, as indicated by the legend "a=28." This can be done in various ways. There is no slip of the elastic rubber sheet L between the anterior rolls 63 and 61. The equal pressure feed-rolls 64—65 can be turned at higher peripheral speed than the anterior rolls 63—61. This difference in speed can be regulated, in order to regulate the longitudinal stretch of the elastic sheet L and its reduction in width. For this purpose, the shaft 62 can be provided with a regulated positive drive. An an alternative, the shaft 62 can be provided with an adjustable brake, like the brake 80 which is later described. If desired, the shaft 60 can be provided with such brake. I prefer to stretch the elastic sheet L and to reduce its width, only between the rolls 64—65 and 55—57, so that the elastic sheet L is under zero tension when the perforations are formed therein. However, by applying an adjustable brake to shaft 60, I can subject the elastic sheet L to tension in the perforating zone.

The width of the rubber sheet L is restored in the machine to the normal width of 36 inches, as indicated by the legend "b=36," anterior the combining zone between the combining pressure rolls 55 and 57, while the longitudinal tension on the rubber sheet L is maintained, preferably, but not necessarily, at a constant value. In order to restore the width of the rubber sheet L in the machine to its original width of 36 inches, while maintaining the rubber sheet L under longitudinal tension, I use a series of identical spreading or lateral expansion rolls 68, 69 and 70.

Between the rolls 64—65 and 55—57, the longitudinal tension on the elastic sheet L may be the same as, or more or less than, the longitudinal tension between the rolls 63—61 and 64—65.

If, as is preferred, the elastic sheet L is longitudinally stretched and laterally reduced, only between the rolls 64—65 and 55—57, I provide enough longitudinal space between rolls 64—65 and the first expansion roll 68, in order to reduce the width of sheet L to 28 inches between rolls 64—65 and said first expansion roll 68. The spreading roll 68 has an axial, non-rotating rod or shaft 71. This shaft or rod 71 is fixed in any suitable manner to the fixed frame F of the combining machine. A series of disks 72 are turnably mounted upon the rod or shaft 71, by means of conventional ball-bearings 73. Each spreading roll 68 has a series of pairs of spreading or expansion members, which are movable laterally, namely in the direction of the axis of rod or shaft 71. Each pair of spreading or expansion members comprises a respective pair of slide supports 74 and 75, as shown in Figs. 3 and 4. As shown in Fig. 3, each pair of supports 74 and 75 has interfitting lateral extensions at their adjacent ends. The supports 74 and 75 have respective cam-rolls 74a and 75a. Each support 75 and 74 also has two respective wedge-shaped guide studs 75b or 74b. The guide-studs 74b are slidable in wedge-shaped guide slots of two said disks 72, and the guide-studs 75b are slidable in similar slots of the other two disks 72. Hence the supports 74 and 75 are accurately guided in lateral sliding movements, in a direction parallel to the axis of the fixed rod or shaft 71. Respective cam-disks 76 and 77 are fixed to the fixed rod or shaft 71. These cam-disks 76 and 77 have respective cam-grooves 76a and 77a. When the expansion supports 74 and 75 are turned around the axis of the rod 71, the cam-rolls 74a and 75a and the cam-grooves 76a and 77a impart reciprocating lateral movements to said expansion supports. These spreader rolls 68, 69 and 70 are not positively driven. They are turned by the friction of the tensed elastic sheet L.

Fig. 2 shows that the elastic sheet L extends around the bottom portion of the first spreading roll 68, which turns counterclockwise. At the station A of spreading roll 68 which is shown in Fig. 2, the lateral or axial distance between the respective pair of slide supports 74 and 75 is a minimum. At the opposed station D, the axial spacing between the respective pair of slide supports 74 and 75 is a maximum. This axial spacing increases from zero to the maximum at the intermediate stations B and C. The sheet of rubber L contacts with the first roll 68 consecutively at the stations B, C and D. Therefore the sheet of rubber L will be subjected to outward lateral tension and the width of said sheet of rubber L will be gradually increased as it passes around the bottom part of the roll 68, thus increasing said width above the reduced width of 28 inches.

At the next spreader roll 69, which turns clockwise, there is said minimum axial spacing at the station E and said maximum spacing at the station F, because the sheet of rubber L extends around the top part of the second spreader roll 69. At the third spreader roll 70, which turns counterclockwise, there is minimum spacing between the respective pair of supports 74 and 75 at station G and maximum spacing at the station K, and the elastic sheet extends around the bottom part of roll 70.

The width of the rubber sheet L is thus gradually and consecutively increased by the spreader rolls 68, 69 and 70, until said width has been increased to its normal width of 36 inches, when the rubber sheet passes around the guide roll 78 which is mounted upon the shaft 79. This normal width is preferably maintained in the combining zone between the combining rolls 55—57. The longitudinal tension on rubber sheet L is maintained by rolls 55—57, while its width is thus increased.

The shaft 52 of the roll 11a is provided with an adjustable brake 80, in order to retard the feed and to regulate the longitudinal tension of the coated fabric or other outer layer which is taken off the roll 11a. The shaft 54 of the roll 53 is provided for this purpose with a similar adjustable brake. These shafts 52 and 54 are not positively driven in this embodiment. The shaft 58 of the bottom combining roll 57 is positively driven and said bottom combining roll 57 drives the companion upper combining roll 55 by friction. Each layer of fabric or other material which is thus taken off the rolls 11a and 53 is therefore subjected to any desired longitudinal tension by adjusting the respective brakes 80. As one example, the original width of the coated knit cloth on the rolls 11 and 53 is 48 inches, and sufficient longitudinal tension is impressed upon the two layers of coated fabric, in order to reduce such width to 36 inches, as indicated by the legend "b'=36," in the combining zone between the feed and combining rolls 55 and 57. Hence, when the final combination is made between the two sheets of coated fabric and the intermediate sheet of rubber L, said three sheets are under longitudinal tension and they are superposed and of equal width. The combined fabric is spirally wound to form a take-up roll 81 upon a take-up shaft 82, which is connected to a companion alined shaft 83 by means of a conventional friction clutch 84. This friction clutch 84 is of the conventional slip type, whose slip can be regulated, so that it is possible to maintain a selected and adjustable difference of angular velocity between the shafts 82 and 83. The combined fabric is thus wound under suitable selected tension to form the take-up roll 81. The width of the wound-up fabric in the take-up roll 81 may be the aforesaid reduced width of 36 inches, which is the permanent normal width of the laminated material. The shaft 83 is provided with a sprocket 85, which is connected by a chain 86 to a sprocket 87, which is fixed to an extension 88 of shaft 58. Another sprocket 89 is fixed to said extension 88. Sprocket 89 is connected by a chain 90 to a sprocket 91 which is fixed to a shaft 92. The shaft 92 is associated with a shaft 93.

Fig. 2 illustrates a conventional adjustable Reeves drive, which includes a belt 94, so that shafts 92 and 93, and hence shafts 58 and 67, can be turned at different angular velocities, so that rolls 64—65 and 55—57 can be turned at different peripheral speeds. The shaft 93 is provided with a sprocket 95, which is connected by a chain 96 to a sprocket 97 of the shaft 67.

The extension 88 is provided with a gear 98 which meshes with a gear 99 of the main drive shaft 100, whose pulley 101 is driven from any suitable source of power.

Figure 1:
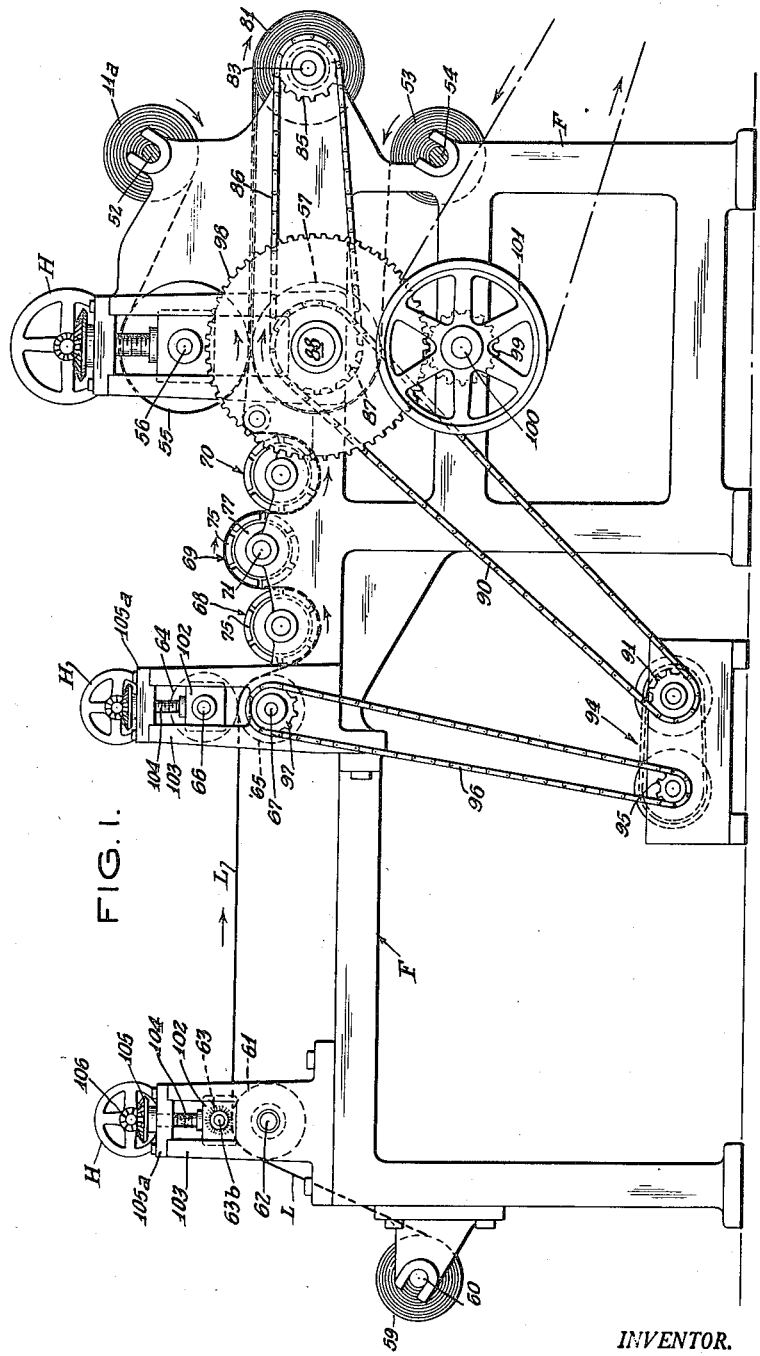
Fig. 1 is a side elevation, partially in vertical section, of a doubling or combining machine which combines the respective layers of fabric with an intermediate sheet of rubber, according to my method.

Fig. 1 shows the frame F of the machine. Fig. 1 also shows that the shaft 63b of the perforating roll 63 is provided with conventional bearings 102 which are vertically slidable in guides 103 of the frame F. The downward pressure upon the bearings 102 is provided by conventional means, such as a screw 104, which passes through a tapped bore of a plate 105a, which is fixed detachably to guides 103. The shank of said turnable screw 104 is provided with a bevel gear 105, which is turned by a smaller bevel gear 106 whose shaft is rotated by means of a hand wheel H.

The respective upper shafts 66 and 56 are provided with respective similar bearings and accessory parts, by which regulated downward pressure can be exerted on the bearings of said shafts 66 and 56, by turning the respective hand wheels H.

Fig. 8 shows parts of the respective fabric or other outer layers 110 and 111, and a part of the intermediate latex layer L. In the finished fabric, these layers 110 and 111 are of the same width as sheet L, and the finished laminated fabric is of equal width throughout.

I prefer to use a latex adhesive in which the particles of rubber are unvulcanized in the aqueous dispersion, and to provide said dispersion with a high concentration of accelerator and vulcanizer. The required amounts of accelerator and vulcanizer are preferably added to the dispersion immediately before it is used, so as to prevent premature vulcanization or ageing of the rubber.

By controlling or regulating the longitudinal tension of the intermediate sheet of rubber and the longitudinal extension of the outer layers at the combining zone, the finished laminated material can be given different degrees of stretchability in both the longitudinal and lateral direction.

The improved method is preferably a dry method because the outer layers and their surface coatings are dry, and said surface coatings are tacky when they are joined to the intermediate sheet of rubber.

The outer cloth layers of the composite or laminated fabric, immediately after such composite or laminated fabric has been made and before winding said fabric to form the take-up roll 81, can be saturated with water by passing such laminated or composite fabric through an ordinary water bath at 20° C.-25° C. The material is then dried and wound under slight tension in a spiral roll. The drying can be accomplished by passing the wet material with friction over drying cylinders, in order to give a surface gloss. This treatment does not change the normal width of the laminated fabric. These hot drying cylinders may have a temperature of 100° F. to a little below 212° F. The prompt immersion in water and the subsequent drying seem to accelerate the final curing of the coatings of latex and of the latex sheet L.

The shafts 92 and 93 are parts of a conventional "Reeves" drive, which includes a belt 94, so that the shafts 92 and 93 can be driven at the same angular velocity, or at different selected respective angular velocities.

The extension 88 has a gear 98 which meshes with a gear 99 of the main drive-shaft 100, whose pulley 101 is connected to a suitable motor.

By changing the gear ratio between gears 98 and 99, I can rotate shaft 58 at selected angular velocity, so that the equal combining rolls 55 and 57 are turned at the same selected peripheral speed.

By adjusting the friction brakes 80 of shafts 52 and 54, I can regulate the tension on the outer layers in the combining zone, without changing the peripheral speed of rolls 55 and 57. By adjusting the friction coupling 84 so that it slips at a selected point, I control the tension at which the laminated fabric is wound to form the take-up roll 81.

By adjusting the "Reeves" drive, I can rotate the shaft 67 at any selected angular velocity relative to the angular velocity of shaft 58. In this embodiment, the diameter of the equal rolls 64—65 is less than the diameter of the equal rolls 55—57. If the elastic sheet L is to be maintained under constant longitudinal tension between rolls 64—65 and rolls 55—57, I turn the shaft 67 at greater angular velocity than the shaft 58, so that the peripheral speed of rolls 64—65 equals the peripheral speed of rolls 55—57.

By turning the rolls 55—57 at greater peripheral speed than the rolls 64—65, I subject the elastic sheet L to greater longitudinal tension between rolls 64—65 and 55—57, than between rolls 63—61 and 64—65.

Instead of relying upon friction drive between the pairs of rolls 64—65, 55—57, in order to turn the rolls of each pair at the same respective peripheral velocity, I can connect the rolls of each said pair by gears.

Instead of relying on an adjustable friction brake to control the elongation of elastic sheet L, if the sheet L is to be longitudinally extended between rolls 63—61 and 64—65, I can positively drive shaft 62 or shaft 63b at suitable regulated angular velocity.

If the outer layers are made of woven fabric which are only slightly longitudinally elongated, and which are fed through the machine in the direction of their longitudinal warp threads, the width of such woven fabric layers is only slightly diminished, and the normal width of the laminated fabric is equal or substantially equal to the normal width of such woven fabric layers. In such case, the laminated fabric has substantially only one-way stretch, in the direction of the parallel filler yarns of the outer fabric layers.

Instead of applying a single outer layer to each face of the sheet L, I can apply two or more laterally separated or laterally abutting layers, which need not be identical. Thus, I can apply an outer weft-knit layer to each face of the sheet L, between its edges, so that said weft-knit layers are superposed. These outer weft-knit layers are thus applied with their rows of loops, parallel to the longitudinal direction of feed. In such case, I can apply additional outer woven bias-cut layers to the edge-portions of sheet L. I can thus produce a laminated fabric of different degrees of longitudinal stretch between its longitudinal edges. Also, such outer median layers may be woven fabric, in which the warp threads are parallel to the longitudinal direction of feed, and the edge-layers may be weft-knit fabric.

In such case, the median part of the laminated fabric will have substantially only one-way stretch, and its edge-portions will have four-way stretch. Such fabric can be used, for example, to make a girdle, in which the filler threads will be horizontal.

Also, the median part of the fabric may have four-way stretch, and its upper or lower edge-part may have only vertical one-way stretch.

Many such combinations can be made, depending upon the use of the laminated fabric or material.

I can thus produce a laminated fabric of different respective elasticities, without the necessity of sewing strips of material to each other.

If I use woven fabrics, these need not be of uniform weave. The number of warp threads per inch may vary across the width of the fabric.

Likewise, in using weft-knit fabrics, they may be of different construction across their widths, as by forming ribs or increasing the number of yarns.

I have disclosed preferred embodiments of my invention, but numerous changes, omissions, and additions can be made without departing from its scope. Thus, my invention includes its sub-combinations. For example, I can connect a single layer of fabric or the like to an elastic sheet.

Also, referring to Fig. 2, I can clamp the untensed elastic sheet along its longitudinal edges between a series of pairs of turnable pressure rolls, like the rolls 64—65, and then stretch said sheet longitudinally while said edge-pressure rolls rotate, so that the elastic sheet is longitudinally stretched, without reducing its normal width. I then join said elastic sheet to one or more layers, at one or both faces of said elastic sheet. I then release said elastic sheet and trim off the edge-portions at which it has been clamped.

However, for large-scale production, I prefer to use the method in which the width of the elastic sheet is reduced and said elastic sheet is then laterally extended.

One of the advantages of my invention is that the laminated material is of constant or substantially constant width.

When an elastic sheet L is longitudinally stretched, it is difficult to maintain it at constant width. The slides 74 and 75 contact with substantial friction and little or no slip with the longitudinally tensed elastic sheet L, so that this is kept at constant selected width in the combining zone, thus producing a laminated material of two or more layers, of constant or substantially constant width.

By using an additional flexible layer or layers which can be sufficiently elongated, I prevent the formation of wrinkles or pleats in the finished material. In some cases, the length of the fabric layer or other layer in the finished laminated material is not less than its normal unstretched length. Thus, I can easily stretch flexible layers of many materials to 110% or more of their normal length, and stretch the elastic sheet to the same extent. In such case, the length of the additional layer in the laminated material will be equal to the length of the unstretched layer. Ordinarily, I stretch the elastic layer L sufficiently so that the length of an additional layer is less than its normal unstretched length.

In the laminated material, the length of an additional layer may exceed its normal unstretched length.

When the sheet L is to be longitudinally extended and laterally reduced, only between rolls 64—65 and 55—57, which is preferred, I regulate this longitudinal extension and lateral reduction, by regulating the relative angular velocities of shafts 58 and 67, so that the peripheral speed of rolls 55—57 exceeds that of rolls 64—65, in the desired ratio, in order to control the longitudinal extension of sheet L.

If the outer layers are weft-knitted fabrics, I prefer to longitudinally extend such layers until their loops are wholly or substantially laterally closed, although the extent of such lateral stretch is optional.

Fig. 3 shows how the longitudinal extension of elastic sheet L causes its longitudinal edges, which are originally parallel to each other, to become concave. In such case, the reaction of the longitudinally extended sheet is not longitudinal adjacent its longitudinal edges. However, in my improved machine and method, the longitudinal edges of the sheet L are parallel to each other at the guide roll 78, and hence anterior to and in the combining zone, because the elastic sheet L has been restored to its normal width at guide-roll 78, and said guide-roll 78 and the sheet L have enough friction to maintain said full width. Also, the longitudinal tension on sheet L is maintained between guide-roll 78 and the combining rolls 55 and 57. Hence, when the lamination is completed, the longitudinal edges of the elastic sheet L and of the outer layers are parallel to each other and to the direction of feed, which is advantageous in order to secure a laminated product of uniform width and uniform lateral elasticity. If an outer layer is made of leather or the like, which is only slightly streched, the laminated material may have visible pleats or corrugations.

The binder layer is preferably stretchable, so that, after being formed under substantially zero tension, said binder layer can be stretched in unison with its base layer of fabric or other material, without separation between said binder layer and said base layer. Said binder layer is also preferably elastic.

I claim:

1. A method of producing a laminated material, which consists in stretching an elastic layer so as to increase its normal dimension in the direction of stretch and also to decrease its normal lateral dimension in a direction lateral to said direction of stretch to a reduced lateral dimension, also stretching said elastic layer laterally to increase said reduced lateral dimension to a greater lateral dimension, and then joining said stretched elastic layer to the adjacent faces of respective additional layers between which said elastic layer is located, and then releasing said elastic layer from tension.

2. A method according to claim 1, in which the maximum greater lateral dimension of said elastic layer substantially equals its normal lateral dimension.

3. A method according to claim 1, in which said greater lateral dimension of said elastic layer substantially equals said normal lateral dimension.

4. A method according to claim 1, in which said additional layers are stretchable, said additional layers are stretched in the direction of said stretch and have a reduced width of less than normal width under said stretching, and said reduced width of said additional layers is substantially equal to said greater lateral dimension of said elastic layer.

5. A method according to claim 1, in which said adjacent faces are coated with a binder while said additional layers are under substantially zero stretch, before joining said outer layers to said intermediate layer.

6. A method according to claim 1, in which said additional layers are stretchable, said additional layers are stretched in the direction of said stretch and have a reduced width of less than normal width under said stretching, and said reduced width of said additional layers is substantially equal to said greater lateral dimension of said elastic layer, and said adjacent faces are coated with a binder while said additional layers are under substantially zero stretch, before joining said outer layers to said intermediate layers.

7. A method according to claim 1, in which said additional layers are weft-knitted fabrics, said additional layers are stretched in the direction of their loops to reduce their width to less than normal width, and said reduced width of said weft-knitted fabrics substantially equals said greater lateral dimension of said elastic layer.

8. A method according to claim 1, in which said additional layers are weft-knitted fabrics, said additional layers are stretched in the direction of their loops to reduce their width to less than normal width, and said reduced width of said weft-knitted fabrics substantially equals said greater lateral dimension of said elastic layer, said greater lateral dimension being substantially equal to said normal lateral dimension.

9. A laminated material which comprises outer stretchable layers which are joined to an intermediate elastic layer, said intermediate elastic layer being normal length and width when said laminated fabric is unstressed, the length of each said outer stretchable layer being greater than its normal length, the width of each outer stretchable layer being less than its normal width, each said outer stretchable layer diminishing in width from its normal width when it is stretched beyond normal length.

10. A laminated material according to claim 9, said outer layers being of weft-knit fabric, the length of each said outer layer being in the direction of its parallel loops.

11. A laminated material which comprises outer stretchable layers which are joined to an intermediate elastic layer, said intermediate elastic layer being of normal length and width when said laminated fabric is unstressed, the length of each said outer stretchable layer being greater than its normal length, the width of each outer stretchable layer being less than its normal width, each said outer stretchable layer diminishing in width from its normal width when it is stretched beyond normal length, said outer layers being woven fabrics, the length of each said outer layer being in a direction which is inclined to its warp threads and filler threads.

12. A laminated fabric which comprises two outer layers of woven fabric whose warp threads are parallel to the length of said laminated fabric, the inner faces of said outer layers being joined to an intermediate elastic layer, the normal width of said elastic layer being substantially equal to the width of said outer layers, said fabric being of substantially uniform lateral elasticity.

13. A method of producing a laminated material which consists in stretching an elastic layer so as to increase its normal dimension in the direction of stretch and also to decrease its normal lateral dimension to a reduced lateral dimension in a direction lateral to said direction of stretch, also stretching said elastic layer laterally to increase said reduced lateral dimension to a greater lateral dimension, then joining said stretched elastic layer to a face layer, and then releasing said elastic layer from tension.

14. A method of producing a laminated material which consists in stretching an elastic layer so as to increase its normal dimension in the direction of stretch and also to decrease its normal lateral dimension to a reduced lateral dimension in a direction lateral to said direction of stretch, also stretching said elastic layer laterally to increase said reduced lateral dimension to a greater lateral dimension, then joining said stretched elastic layer to a face layer, and then releasing said elastic layer from tension, said greater lateral dimension being substantially equal to said normal dimension.

15. A method of joining a stretchable layer to an elastic layer, at an inner face of said stretchable layer, which comprises applying binder material to said inner face to form a stretchable binder layer at said inner face, said binder layer being thus formed while said stretchable layer is under substantially zero tension, and then joining said binder layer to said elastic layer while said stretchable layer and its binder layer are extended and while said elastic layer is under tension in the same direction as said stretchable layer and said binder layer.

16. A method according to claim 15, in which said elastic layer is also subjected to tension in a lateral direction which is perpendicular to said first-mentioned direction.

ALVIN NASHLEY.

REFERENCES CITED

The following references are of record in the file of this patent:

UNITED STATES PATENTS

| Number | Name | Date |
| --- | --- | --- |
| 1,210,930 | Hadfield et al. | Jan. 2, 1917 |
| 1,242,698 | Jacobs | Oct. 9, 1917 |
| 2,235,682 | Hawley, Jr. | Mar. 18, 1941 |
| 2,397,838 | Chavannes | Apr. 2, 1946 |
| 2,413,970 | Hawley, Jr. | Jan. 7, 1947 |
| 2,423,294 | Colesworthy | July 1, 1947 |